(12) United States Patent
Jacobs et al.

(10) Patent No.: US 8,750,382 B2
(45) Date of Patent: Jun. 10, 2014

(54) SYSTEM AND METHOD FOR CALCULATING 3DEEPS ACTION SPECS MOTION ESTIMATION FROM THE MOTION VECTORS IN AN MPEG FILE

(76) Inventors: Kenneth Martin Jacobs, New York, NY (US); Ronald Steven Karpf, Corvallis, OR (US)

( * ) Notice: Subject to any disclaimer, the term of this patent is extended or adjusted under 35 U.S.C. 154(b) by 529 days.

(21) Appl. No.: 13/168,493

(22) Filed: Jun. 24, 2011

(65) Prior Publication Data

US 2011/0249092 A1    Oct. 13, 2011

Related U.S. Application Data

(60) Continuation-in-part of application No. 12/555,482, filed on Sep. 8, 2009, now Pat. No. 7,976,159, and a continuation-in-part of application No. 12/938,495, filed on Nov. 3, 2010, now abandoned, which is a division of application No. 12/555,545, filed on Sep. 8, 2009, now Pat. No. 7,850,304, which is a continuation-in-part of application No. 12/274,752, filed on Nov. 20, 2008, now Pat. No. 7,604,348, said application No. 12/555,482 is a division of application No. 12/274,752, which is a continuation-in-part of application No. 11/928,152, filed on Oct. 30, 2007, now Pat. No. 7,508,485, and a continuation-in-part of application No. 11/372,723, filed on Mar. 10, 2006, now Pat. No. 7,522,257, said application No. 11/928,152 is a continuation of application No. 11/373,702, filed on Mar. 10, 2006, now Pat. No. 7,405,801, said application No. 11/372,723 is a continuation of application No. 11/373,702, said application No. 11/372,723 is a continuation-in-part of application No. 10/054,607, filed on Jan. 22, 2002, now Pat. No. 7,030,902, said application No. 11/928,152 is a continuation-in-part of application No. 10/054,607.

(60) Provisional application No. 61/398,981, filed on Jul. 2, 2010, provisional application No. 60/664,369, filed on Mar. 23, 2005, provisional application No. 60/661,847, filed on Mar. 15, 2005, provisional application No. 60/263,498, filed on Jan. 23, 2001.

(51) Int. Cl.
*H04N 7/12*     (2006.01)
*H04N 15/00*   (2006.01)

(52) U.S. Cl.
USPC ........................................ 375/240.16; 348/43

(58) Field of Classification Search
USPC .............. 375/240.16, 240.25; 348/43, 53, 44; 382/285
See application file for complete search history.

(56) References Cited

U.S. PATENT DOCUMENTS 4,049,339 A    9/1977 Ledan
(Continued)

FOREIGN PATENT DOCUMENTS

JP    7287191 A    10/1995

OTHER PUBLICATIONS

Lit et al., Simple reaction time as a function of luminance for various wavelengths, Perception & Psychophysics, vol. 10(6), pp. 1-7, 1971.

(Continued)

*Primary Examiner* — Gims Philippe
(74) *Attorney, Agent, or Firm* — Lucas & Mercanti, LLP

(57) ABSTRACT

Optimal control of 3Deeps Action Specs (also called 3Deep Viewing Spectacles in previous patent applications) for viewing motion pictures filmed in 3D with a visual effect of 3D requires calculation of a single motion vector that characterizes the direction and speed of motion for each motion picture frame. This invention discloses the calculation of the characteristic motion vector or motion estimation value from temporal redundancy information that is stored in the compressed video file bit stream. The principles of this invention can be used with any compressed video file that incorporates temporal redundancy for compression, such as MPEG.

10 Claims, 7 Drawing Sheets

(56) References Cited

U.S. PATENT DOCUMENTS

| | | |
|---|---|---|
| 4,429,951 A | 2/1984 | Hirano |
| 4,562,463 A | 12/1985 | Lipton |
| 4,597,634 A | 7/1986 | Steenblik |
| 4,705,371 A | 11/1987 | Beard |
| 4,717,239 A | 1/1988 | Steenblik |
| 4,805,988 A | 2/1989 | Dones |
| 4,893,898 A | 1/1990 | Beard |
| 5,002,364 A | 3/1991 | Steenblik |
| 5,144,344 A | 9/1992 | Takahashi et al. |
| 5,619,256 A * | 4/1997 | Haskell et al. ............ 348/43 |
| 5,717,415 A | 2/1998 | Iue et al. |
| 5,721,692 A | 2/1998 | Nagaya et al. |
| 5,835,264 A | 11/1998 | Tandler et al. |
| 6,163,337 A * | 12/2000 | Azuma et al. ............ 348/43 |
| 6,220,709 B1 | 4/2001 | Heger |
| 6,314,211 B1 * | 11/2001 | Kim et al. ............ 382/285 |
| 6,385,245 B1 | 5/2002 | De Haan et al. |
| 6,449,005 B1 | 9/2002 | Faris |
| 6,456,432 B1 | 9/2002 | Lazzaro et al. |
| 6,598,968 B1 | 7/2003 | Davino |
| 6,678,091 B2 | 1/2004 | Tropper |
| 6,882,473 B2 | 4/2005 | Geier et al. |
| 7,030,902 B2 | 4/2006 | Jacobs |
| 7,086,735 B1 | 8/2006 | Provitola |
| 7,218,339 B2 | 5/2007 | Jacobs |
| 7,405,801 B2 | 7/2008 | Jacobs |
| 7,508,485 B2 | 3/2009 | Jacobs et al. |
| 7,522,257 B2 | 4/2009 | Jacobs |
| 7,604,348 B2 | 10/2009 | Jacobs |
| 7,850,304 B2 | 12/2010 | Jacobs |

OTHER PUBLICATIONS

Lit A., The magnitude of the pulfrich stereo-phenomenon as a function of target velocity, Journal of Experimental Psychology, vol. 59(3), pp. 165-175, 1960.

Dipert, B., Video improvements obviate big bit streams, EDN: Information, News, & Business Strategy for Electronics Design Engineers, pp. 83-102, Mar. 15, 2001.

Dipert, B., Video quality: a hands-on view, EDN: Information, News, & Business Strategy for Electronics Design Engineers, pp. 83-96, Jun. 7, 2001.

Philips semiconductors MELZONIC chip-Technology backgrounder, Press Release by NXP, Mar. 3, 1997.

Wikipedia Contributors, "Moving Picture Experts Group," Wikipedia, The Free Encyclopedia, May 5, 2011, Web, Jun. 22, 2011.

Wikipedia Contributors, "Video compression," Wikipedia, The Free Encyclopedia, May 22, 2011, Web, Jun. 22, 2011.

Wikipedia Contributors, "MPEG-1," Wikipedia, The Free Encyclopedia, Apr. 22, 2011, Web, Jun. 22, 2011.

Rob Koenen, "Overview of the MPEG-4 Standard," International Organisation for Standardisation Organisation Internationale De Normalisation ISO/IEC JTC1/SC29/WG11 Coding of Moving Pictures and Audio, http://mpeg.chiariglione.org/standards/mpeg-4/mpeg-4.htm, Mar. 2002, Web, Jun. 22, 2011.

* cited by examiner

| Algorithm 1 – Motion Estimation for frame(f) | |
|---|---|
| 1 | If frame(f) is an I-frame<br>$me(f) = me(f-1)$    if $f > 0$<br>$me(f) = 0$    if $f = 0$ |
| 2 | If frame(f) is an P-Frame or B-frame<br>$me(f) = avg(h_{ij})$<br>for $\begin{cases} i = 1 \text{ to } 20, j = 1 \text{ to } 15 \\ h_{ij} <> 0 \\ h_{ij} \text{ is not null} \end{cases}$ |

FIG 3

SYSTEM AND METHOD FOR CALCULATING 3DEEPS ACTION SPECS MOTION ESTIMATION FROM THE MOTION VECTORS IN AN MPEG FILE

CROSS REFERENCE OF RELATED APPLICATIONS

This application claims priority from U.S. Provisional application No. 61/398,981, filed on Jul. 2, 2010, and is a Continuation-In-Part (CIP) of U.S. patent application Ser. No. 12/938,495, filed Nov. 3, 2010, which is a divisional of U.S. patent application Ser. No. 12/555,545, now U.S. Pat. No. 7,850,304, filed Sep. 8, 2009, and U.S. patent application Ser. No. 12/555,482, filed Sep. 8, 2009, which is a divisional application of U.S. patent application Ser. No. 12/274,752, now U.S. Pat. No. 7,604,348, filed Nov. 20, 2008, which in turn is a CIP application of U.S. patent application Ser. No. 11/928,152, now U.S. Pat. No. 7,508,485, filed on Oct. 30, 2007 and U.S. patent application Ser. No. 11/372,723 filed on Mar. 10, 2006, which claims priority of U.S. Provisional Application No. 60/664,369 filed on Mar. 23, 2005 and is a continuation-in-part application of the U.S. application Ser. No. 10/054,607, now U.S. Pat. No. 7,030,902, filed on Jan. 22, 2002, which in turn claims priority of U.S. Provisional Application No. 60/263,498 filed on Jan. 23, 2001. The based applications, U.S. patent application Ser. No. 11/928,152 and U.S. patent application Ser. No. 11/372,723, also claim priority of U.S. patent application Ser. No. 11/373,702 filed on Mar. 10, 2006, which claims priority of U.S. Provisional Application No. 60/661,847 filed on Mar. 15, 2005. The entire contents of each of the above applications are being herein incorporated by reference for all purposes.

TECHNICAL FIELD

This invention relates to the field of motion pictures and to a system called 3Deeps that will allow almost any motion picture filmed in 2D (single image) to be viewed with the visual effect of 3-dimensions when viewed through 3Deeps Filter Spectacles. More specifically, the invention relates to the use of temporal redundancy information in compressed video files, such as MPEG, to calculate the motion estimation value for control of 3Deeps Viewing Spectacles.

BACKGROUND OF THE INVENTION

Motion pictures are images in 2-dimensions. However, several methods have been developed for providing the illusion of depth or 3-dimensions in motion pictures. These include the Anaglyph, Intru3D (also called ColorCode 3D), IMAX (Polaroid), and shutter glasses.

Anaglyph 3-Dimensional Illusion

"Anaglyph" refers to the red/blue (red/cyan or red/green) glasses that are used in movies, comic books cereal packets etc. The glasses consist of nothing more than one piece of transparent blue plastic and one piece of transparent red plastic. These glasses are easy to manufacture and have been around since the 1920s.

An anaglyph stereo picture starts as a normal stereo pair of images, two images of the same scene, shot from slightly different positions. One image is then made all green/blue and the other is made all red, the two are then seen together.

When the image is viewed through the glasses the red parts are seen by one eye and the other sees the green/blue parts. The visual cortex of the brain fuses this into perception of a three-dimensional scene or composition. This effect is fairly simple to do with photography, and extremely easy to do on a PC, and it can even be hand-drawn. The main limitation of this technique is that because the color is used in this way, the true color content of the image is usually lost and the resulting images are usually in black and white. As the colors compete for dominance they may appear unstable and monochromatic. A few images can retain a resemblance to their original color content, but the photographer has to be very selective with color and picture content.

Intru3D—Intel

Intel's Intru3D uses the ColorCode 3D method that is an update to the more familiar Anaglyph method of 3D stereoscopy. It is similar to the Anaglyph method of stereoscopy but rather than make one image green/blue and the other image red, Intru3D records the two images as amber and blue. This provides generally truer color than typical Red/Blue anaglyphs, particularly where Red image components are concerned.

IMAX (Polaroid) 3-Dimensional Illusion

IMAX creates the illusion of 3-dimensional depth by recording the motion pictures on two separate rolls of film with two camera lenses to represent the left and right eyes. These lenses are separated by an interocular distance of about 2.5 inches that is the average distance between a human's eyes. By recording on two separate rolls of film for the left and right eyes, and then projecting them simultaneously, IMAX can create a 3-Dimensional illusion for viewers.

IMAX uses either of two different methods to create the 3D illusion in the theatre. The first method relies on polarization. During projection, the left eye image is polarized in one direction and the right eye image polarized perpendicular to the left eye image as they are projected on the IMAX screen. By wearing special viewing glasses with lenses polarized in their respective directions to match the projection, the left eye image can be viewed only by the left eye since the polarization of the left lens will cancel out that of the right eye projection, and the right eye image can be viewed only by the right eye since the polarization of the right lens will cancel out that of the left eye projection.

IMAX also uses another method—shutter glasses—for 3D viewing. This method of 3D projection involves the use of LCD shutter glasses that use similarly polarized lenses for both eyes. The left and right eye images are projected on the viewing screen in alternate frames. These LCD shutter glasses are synchronized to the projector. The projector displays the left and right images that are momentarily viewed by the appropriate eye by allowing that LCD lens to become transparent while the other remains opaque. That is when the left eye frame is projected on the screen, the left lens of the shutter glasses becomes transparent and the right lens of the shutter glasses becomes opaque. When the next frame is projected on the screen—a frame for the right eye—the left lens becomes opaque and the right lens becomes transparent.

In both the IMAX 3D systems only the correct eye is allowed to view the correct image while the other eye is 'blinded'. The 'transparent' state is actually quite dark, and occludes about 40% of the projected light to the viewing eye while the non-viewing eye is supposed to view no image at all.

Shutter Glasses

Different formulations of shutter glasses have been implemented over the last few decades, but without much large-scale commercial success. A shutter glasses solution generally require two images for each image of video, with shutter covering or uncovering each eye of the viewer. This allows one eye to see, then the other, with the shutters timed and synchronized with the video so that each eye only sees the image intended for it.

Some shutter glass systems are wired to a control device while some shutter glass systems use wireless infrared signaling to control the state of the lenses.

CrystalEyes is the name of a stereoscopic viewing product that was produced by the StereoGraphics Corporation of San Rafael, Calif. They are lightweight, wireless liquid crystal shuttering eyewear that are used to allow the user to view alternating field sequential stereo images. The source of the images alternately displays a left-eye view followed by a right-eye view. CrystalEyes' shutters can block either of the user's eyes so that only images appropriate for each eye are allowed to pass. A wireless infrared communications link synchronizes the shuttering of the eyewear to the images displayed on the monitor or other viewing screen. CrystalEyes shutter glasses, weigh only 3.3 ounces, use two 3V lithium/manganese dioxide batteries, and have a battery life of 250 hours. This demonstrates the robustness and potential of any viewer glass solution.

Because shutter glasses only expose each eye to every other frame, the refresh rate of the video is effectively cut in half. On a TV with refresh rates of 30 frames per second (for an NTSC TV) or 25 frames per second (for a PAL TV), this is hard on the eyes because of the continual flicker. This problem is eliminated with higher refresh rates, such as on PC monitors.

The most recent innovation in shutter glasses from the RealD Corporation of Hollywood, Calif. synchronize dual-image 3-D movies to refresh rates of 120-240 frames per second and are the basis for the 3D TVs on the market today.

Each of these well-known 3D systems is a dual-image system meaning that each eye views different images. The 3Deeps Viewing Spectacles and systems described in previous related patent applications and in this patent application is a single-image system meaning the same single image is viewed by both eyes. This is a totally different approach to producing the illusion of 3D. Motion pictures prepared for viewing by a dual-image 3D system cannot be viewed using 3Deeps, and 3Deeps movies cannot be viewed by any of the dual-image systems for 3D.

SUMMARY OF THE INVENTION

In previous patent disclosures, the inventors have referred to 3Deeps Actions Specs by the name 3Deeps Viewing Spectacles. For consistency with previous patent applications, and so as not to confuse the reader, the name 3Deeps Viewing Spectacles will be used throughout this patent disclosure.

3Deeps Viewing Spectacles allow motion pictures filmed for viewing in 2D to be viewed with a stereoscopic illusion of depth or in 3D. Previous related patent applications have described the construction of 3Deeps Viewing Spectacles with optoelectronic lenses and various methods to calculate and control the optical density settings of the right and left lens for the different versions of 3Deeps.

A common problem addressed in previous related patents is the determination of a single motion vector that characterizes the direction and speed of motion in a frame of a motion picture. This single motion vector is referred to in this patent application as the 'Characteristic 3Deeps Motion Vector' or "motion estimation" value. Various methods have previously been described in related patent applications that calculate the 'Characteristic 3Deeps Motion Vector'. One such method previously described calculates the 'Characteristic 3Deeps Motion Vector' in real-time directly from the digital images of successive frames. Still another previously described method pre-calculates the 'Characteristic 3Deeps Motion Vector' and embeds the information within the motion picture.

Another such method previously described in related patent applications uses video formatting technology, embodied in either software and/or hardware, to calculate the characteristic motion vector. Briefly, digital video monitors such as LCD TVs, plasma TVs, digital cinema projectors, etc., have hardware-based semi-conductor chips to handle the conversion of a digital video file to best fit the characteristics of the viewing monitor. As an example of this video formatting problem, consider the well-known motion picture "The Wizard of Oz". The "Wizard of Oz" was filmed in 1939 at 24 frames per second (fps), but may be viewed today on a high-end digital LCD TV at 120 fps (Hz) requiring the display of four times as many video frames than are in the original movie. It is the function of the video format chip within the LCD TV to generate all the new frames. To achieve that without unsightly artifacts requires tracking motion of scene objects between frames of the motion picture. Methods have been described in previous related patent application to calculate the 'Characteristic 3Deeps Motion Vector' from the set of motion vectors used to solve such video reformatting problems.

This patent application discloses still another method to calculate the 'Characteristic 3Deeps Motion Vector'. Briefly, video compression is achieved in part, by calculating a set of motion vectors between frames, and this information can be used in turn to calculate the 'Characteristic 3Deeps Motion Vector'. The basic idea of video compression is to remove spatial area redundancy within a video frame (e.g. as done with Fax transmissions) and temporal redundancy between video frames. Since the successive frames in a video stream usually do not change much within small time intervals, the temporal redundancies can be used to encode and compress a video frame based on other video frames temporally (successively or previously) close to it.

As an example, MPEG compressed video files record a 16×16 pixel area (referred to as a macro block) of a frame of a motion picture, and then for successive frames only record a motion vector describing the motion of the macro block. In MPEG compression the motion vector has a horizontal and vertical part, each part ranging from −64 to +63 with a positive value indicating that the macro block moves to the right or downward respectively. Any macro block can move up to 64 pixels laterally and vertically between frames. (MPEG compression tracks not just rigid rotation but also macro block rotation.) High compression rates are achievable for moving pictures in part because the next successive frame of a motion video consists in the main of identical information. For instance, if the camera is fixed, the background information for a scene will be mostly identical between the frames of the scene. Most macro blocks will have an associated numerical motion vector indicating the macro block has not moved. In those cases where the macro block exhibits motion between frames, the macro block will have an associated numerical motion vector quantifying where the macro block has moved. In either case, only the motion vector needs to be recorded in the compressed file, not the redundant macro block. Software-based (e.g. Microsoft Media Player) and hardware-based (e.g DVD) video players can read a compressed video file and decompress it back to a video stream for display on a monitor device for viewing. In this patent application, when the digital video file is decompressed, the pre-calculated motion vectors of all such macro blocks are used to calculate the 'Characteristic 3Deeps Motion Vector'.

This has great advantages over previously described methods since it relies on motion vector descriptors that are pre-calculated and stored in the compressed video file, and does not require real-time image processing.

This approach also solves an important implementation problem for 3Deeps. Many of the methods described in previous related patent applications cannot be easily implemented on some video devices. For instance, there is little need for a video format conversion chip on devices such as a PDA, iPOD, portable computer, portable DVD player, cell phones, etc, and such devices may not have the extra computer processing required for real-time image processing. But all these devices read, decompress and display video files in compressed formats, so the method of this patent application can be implemented with little additional overhead. As an example, the Apple iPod does not yet have the processing power for real-time video processing, nor does it have any need for expensive video formatting chips. But the Apple QuickTime format (.mov) uses the technique of temporal redundancies for video compression, allowing this invention to leverage the use of the already calculated motion vectors in the compressed QuickTime video file for control of 3Deeps viewing spectacles so 2D motion video may be viewed as 3D.

The above summary overview referred to MPEG and QuickTime compressed video files as two video file formats that could be used by this invention. While the preferred embodiment of the invention will demonstrate the principle using just the MPEG format, it should be clearly understood that the principles disclosed in the invention could be used by any video compression technique that relies on temporal redundancies to calculate the 'Characteristic 3Deeps Motion Vector'.

In this patent application the term 'Characteristic 3Deeps Motion Vector' is referred to synonymously as 'Motion Estimation Value'.

In one aspect of the invention, a method of calculating a motion estimation value is characterized by the direction and speed of motion of a frame of a motion picture file, where the motion estimation value is estimated from the temporal redundancy information in a digitally compressed video file and the motion estimation value is used to control the lenses of 3Deeps Action Specs. The invention, for example, has the following embodiments:

Embodiment 1

A method for calculating a motion estimation value for controlling the lenses of 3Deeps Filter Spectacles comprising:
  decompressing a compressed video file;
  reading the decompressed video file containing pre-calculated motion vector descriptors, wherein the motion vector descriptors comprises a plurality of frame numbers and a set of motion vectors corresponding to each frame, each frame being segmented into macroblocks, and each macroblock containing a motion vector information;
  accessing the set of motion vectors on a frame by frame basis,
  calculating a motion estimation value; and
  storing in a buffered area or data output file or transmitting the calculated motion estimation value in real-time for controlling the lenses of 3Deeps Filter Spectacles.

Embodiment 2

The method of embodiment 1, wherein the frame is an I-frame, P-frame or B-frame, and the motion vector information comprises a lateral or horizontal component of the motion vector of the macroblock, a vertical component of the motion vector of the macroblock, and a rotation component of the motion vector of the macroblock.

Embodiment 3

The method of embodiment 2, wherein the frame is the I-frame, and the motion estimation value is an average of all non-zero and non-null macroblock motion vectors.

Embodiment 4

The method of embodiment 2, wherein the frame is the P-frame or B-frame, and the motion estimation value is an average of all non-zero and non-null horizontal components of the macroblock motion vectors of the frame.

Embodiment 5

The method of embodiment 2, wherein the I-frame has a center of action comprising an area of a number of horizontal macro-blocks and a number of vertical macro-blocks, the motion estimation value being set to the same motion estimation value as the previous frame.

Embodiment 6

The method of embodiment 2, wherein the P-frame or B-frame has a center of action comprising an area of a number of horizontal macro-blocks and a number of vertical macro-blocks, the motion estimation value being an average of all horizontal components of macro-blocks of the frame, wherein only those horizontal components that are within the area associated with the center of action and only non-zero and non-null motion vectors are included.

Embodiment 7

The method of embodiment 2, wherein the I-frame has an upper region providing surrogate for the background of the frame and a lower region providing surrogate for the foreground of the frame, the motion estimation value being set to the same motion estimation value of the previous frame.

Embodiment 8

The method of embodiment 2, wherein the P-frame or B-frame has an upper region providing surrogate for the background of the frame and a lower region providing surrogate for the foreground of the frame, the motion estimation value being the difference between the average of all horizontal components of macro-blocks of the upper region and the average of all horizontal components of macro-blocks of the lower region, wherein only the non-zero and non-null motion vectors are included in the averaging process and all macro-blocks outside the upper region and the lower region are ignored.

Embodiment 9

The method of embodiment 1, wherein the compressed video file is in MPEG format.

Embodiment 10

The method of embodiment 1, wherein a decompressed video file for display is created containing the motion estimation value embedded into the video file.

Many advantages, features, and applications of the invention will be apparent from the following detailed description of the invention that is provided in connection with the accompanying drawings.

BRIEF DESCRIPTION OF THE DRAWINGS

FIG. 3 is a first algorithm used by the preferred embodiment of the invention to calculate the Motion Estimation value for a frame of a digital video file in the MPEG-1 compression format.

DETAILED DESCRIPTION OF THE INVENTION

Figure 1:
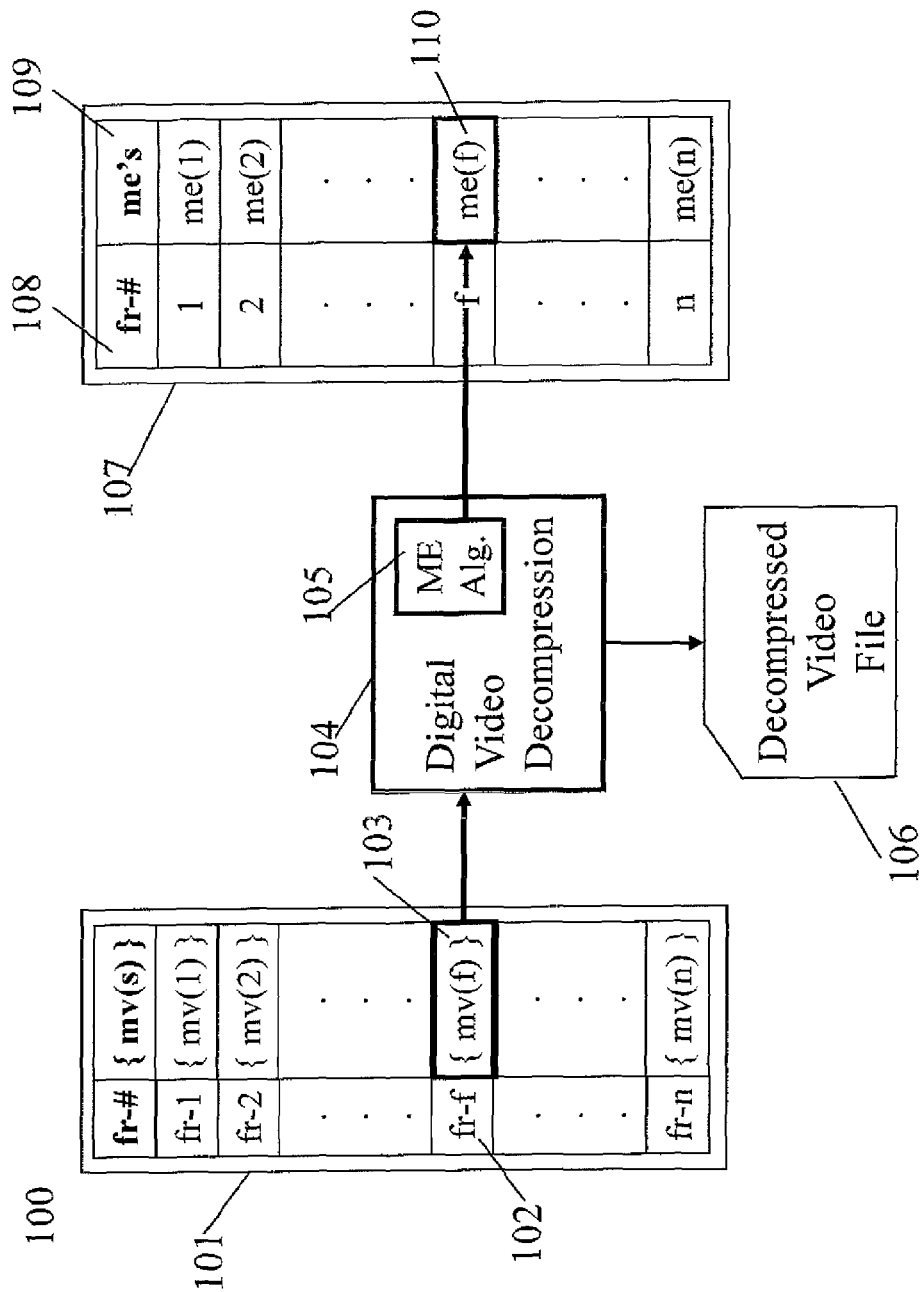
FIG. 1 is a block diagram showing the calculation of the motion estimation value for a frame of a digital video file.

References will now be made in detail to the preferred embodiments of the invention, examples of which are illustrated in the accompanying drawings. Wherever possible, the same reference numbers will be used throughout the drawings to refer to the same or like parts.

To help understand the invention the following summary of inventive work from the previous related patent disclosures is provided. The purpose of this section then is to explain the ground that has been covered in previous related patents and then identify the problems that this current patent application addresses and solves.

The Pulfrich Illusion

There is a well-studied stereoscopic illusion called the Pulfrich illusion in which stereoscopic viewing a motion picture with the illusion of 3D is invoked by differentially shading the left and right eye. Anyone watching TV through special viewing glasses can see the illusion. One way to construct the special Pulfrich viewing glasses is to take sunglasses and remove the left lens, so that the left eye views the TV screen unobstructed and the right eye views the TV screen through the darkened sunglass lens. Another is with cardboard spectacles with a clear left lens and a darker shaded right lens. With such Pulfrich viewing spectacles all screen motion from left-to-right will be in 3D. The illusion is based on basic eye mechanics—the shaded lens causes the eye to send the image to the brain later than unshaded eye. As an example, if the time resultant time delay is 1/10 second between the two eyes, than on a 100 Hz digital TV the difference is 10 screen images, which is enough to produce a vivid illusion of 3D in the presence of moderately paced lateral motion. The image processing part of the brain puts the two disparate images together as depth. This is a pure optical illusion that has nothing to do with how a motion picture is filmed.

We note that 'clear' is a relative term and even 'clear' glass will block a small percentage of light transmission. A clear lens is then one that transmits almost all light through the material.

The Pulfrich illusion has been used for more than 50 years to produce 3D movies, using cardboard viewing spectacles with a clear left lens and dark transparent right lens. Pulfrich 3D motion pictures have been produced including such offerings as the 1971 feature length movie "I, Monster" Starring Christopher Lee as well as selected scenes from the 1997 second season finale of the network TV sitcom "Third Rock From The Sun". However there is a problem in that the special Pulfrich viewing glasses impose severe constraints on both the movie and viewing venue.

More specifically, the problem then is that for any special viewing spectacles with lenses of a fixed optical density, the lighting, and speed and direction of screen motion have to be in exactly proper alignment to get an optimal 3D effect that is comparable to other 3D methods such as anaglyph (blue-red viewing spectacles). That conjunction of light and motion rarely happens so Pulfrich is not considered a viable approach to 3D movies or TV. Movies made for viewing using the Pulfrich illusion are best viewed in darkened venues, and if the same movie is viewed in a brightly lit venue the illusion is diminished or may even totally disappear.

The problems with fixed lens Pulfrich spectacles (left lens clear and right lens shaded) then are:

1. It only shows depth properly when lateral screen motion is from left-to-right. When motion is from right-to-left the appearance of depth is reversed.
2. The movie will view differently depending upon the ambient light of the viewing venue. The illusion of depth is greater in a darkened cinema or TV viewing room than in a brightly lit viewing venue.

These problems could be addressed if dynamic Pulfrich viewing spectacles could be constructed that self-configured themselves to the light and motion instant in a motion picture. Related patent applications have disclosed how to build such spectacles and various means by which they can be controlled to provide an optimal illusion of depth.

First Solution—3Deeps Filter Spectacles

Previous related solutions provided dynamic Pulfrich viewing spectacles (called 3Deeps Viewing Spectacles) that could be synchronized to the movies. These solutions utilized optoelectronic lenses with neutral optical density filters (transmissivity of visible light) that are controllable by an electric potential. The lenses could take any of three states; clear left lens and clear right lens (clear-clear) when there is no screen motion; clear left lens and dark right lens (clear-dark) when screen motion is from left to right; and, dark left lens and clear right lens (dark-clear) when the screen motion is from right to left. Wired or wireless signals (Infrared, radio, or sound) synchronized the 3Deeps viewing spectacles to the movies for scenes exhibiting lateral motion by camera movement itself, or/and by subject filmed. Previous related solutions also addressed how to calculate the lateral motion (direction and speed) between frames of a motion picture. Previous related solutions also addressed the synchronization controllers that calculated and transmitted the motion vector information to the 3Deeps viewing spectacles.

The proposed solutions had significant benefits and advantages including:

Every movie ever made—without additional alteration or processing—could be viewed in 3D when wearing 3Deeps spectacles A movie could be viewed simultaneously by viewers with or without 3Deeps spectacles, and No changes are required to any broadcast standards, cinema formatting, viewing venue, or viewing monitors However, the early 3Deeps spectacles did not address how to calculate an optical density for the lenses of the 3Deeps spectacles that would maximize the Pulfrich stereoscopic illusion.

Second Solution—Continuous Adjustable 3Deeps Filter Spectacles

A more recent related 3Deeps patent applications disclose how to construct better 3Deeps viewing spectacles that maximize the Pulfrich stereoscopic illusion and are referred to as Continuous Adjustable 3Deeps Filter Spectacles. To construct these improved 3Deeps viewing spectacles we continue to use optoelectronic lenses, similar signalization and synchronization between the movie and 3Deeps Viewing Spectacles, but now also utilize the body of existing knowledge about (1) the human eye retinal reaction time, and (2) the operating characteristics of the optoelectronic material of the 3Deeps lens.

Retinal Reaction Time

While each eye is stimulated by light continuously, there is a time delay called the retinal reaction time until the information is triggered and transmitted to the brain. Retinal reaction time is primarily dependent on the amount of light (brightness) that falls on the eye. For instance, in the presence of the bright light of a 'Clear Sky at noon' the retinal reaction time is about 100 milliseconds (1/10-th of a second) and the eye will trigger about every 100 milliseconds and send the image from the eye to the brain. In the presence of light from a 'Clear Sky' the retinal reaction time is slower—about 200 milliseconds. And in the presence of light that approximates a 'Night sky with a full moon' the retinal reaction time is slower still—almost 400 milliseconds. The darker is the illumination, the retinal reaction time become increasingly slower.

While the retinal reaction mechanisms are independent for each eye, in normal viewing both eyes are unobstructed and the luminance value is the same and the eyes trigger at about the same time. However, if one eye is shaded so the eyes have unequal retinal illuminance, then the two eyes will trigger at different speeds and different times. Using lens filters with different optical density shading causes this to happen and results in a difference in retinal reaction time for each eye. The difference in retinal reaction time between the two eyes is one factor in the commonly accepted explanation for the Pulfrich illusion.

The second factor is simultaneity. The brain will take two eye images and put them together in a 'simultaneous' fashion to generate the image that we perceive. Thus in normal viewing, if both eyes see the same 2D image without any filtered obstruction, the brain gets two identical images and there is no information by which the brain may infer depth. However, if one eye is differently shaded, then the eyes send two different images to the brain, and the mind places them together and interprets the two different images as depth. These two factors, retinal reaction time, and simultaneity are the two factors that explain Pulfrich illusion.

If the scene being viewed is static with no moving object, then the 'instant' image of the unshaded eye and the 'lagging image' of the shaded eye will still see the same image and the retinal reaction delay and simultaneity factors will not provide any depth information. Thus, the Pulfrich illusion does not work in the absence of motion. But if the scene being viewed has horizontal motion (also called lateral motion) then the shaded eye will see an image that is 'lagging' the instant image. In this case the 'lagging image' caused by retinal reaction delay of the shaded eye, when juxtaposed with the 'instant image' perceived by the unshaded eye will, through the mechanism of simultaneity, be reconciled by the brain as a perception of depth. This is the Pulfrich illusion.

Well-researched retinal reaction curves describing this phenomenon are available and are used by the Continuous Adjustable 3Deeps Filter Spectacles to select the optical density of the lens to maximize the Pulfrich illusion. This is done in the following exemplary manner. First we measure the ambient light optical density and use that with the retinal reaction curve to get the retinal delay for the eye viewing through the 'clear' lens. We then use the direction of lateral motion to determine which of the right and left lenses is clear (with the other lens the dark lens.) If the lateral motion is from the left-to-right direction on the screen then the 'clear' lens of the Continuous Adjustable 3Deeps Filter Spectacles will be the left lens, and if the lateral motion is in the opposite direction then the 'clear' lens will be the right lens.

To set the optical density of the dark lens we now utilize the magnitude of the motion. As an example, if lateral motion of the major object in the frame is measured as moving at 0.25 inches per frame then it will take 10 frames to move 2.5 inches—the average inter-ocular distance. In this case the Continuous Adjustable 3Deeps Filter Spectacles use the retinal reaction curve to determine an optical density setting for the darkened lens so the motion-direction eye will see a lagging image that is 10 frames behind that of the unshielded eye. If the TV screen has a refresh rate of 100 Hz then 10 frames is precisely 100 milliseconds, so if the ambient light is that of a 'Clear Sky at noon' with a retinal reaction time of 100 milliseconds, then we would set the dark lens to have an optical density of a 'Clear Sky' which corresponds to a retinal reaction time of 200 milliseconds. Depending upon the ambient illumination, the optical density of the dark lens can always be calculated and precisely determined from the retinal reaction curve and the objective function that maximizes the Pulfrich illusion.

Operating Characteristics of the Optoelectronic Material of the 3Deeps Lens

Once the optimal optical density values are known for the lenses of the Continuous Adjustable 3Deeps Filter Spectacles, the Operating Characteristic curve of the optoelectronic material of the lenses can be utilized to apply the correct electric potential to the lenses so the lenses of the viewing spectacles have the optical density so the movie is viewed with a maximal Pulfrich stereoscopic illusion. A recent related patent applications described the means by which Retinal reaction time is used to calculate the optimal optical density value (a first optimization) and the operating characteristic curve is used for control over the lenses of the Continuous Adjustable 3Deeps Filter Spectacles (a second optimization).

Third Solution—Multi-Layered Lenses

Another previously described implementation of 3Deeps Filter Spectacles use multiple layers of optoelectronic material in fabricating the lenses of the 3Deeps Filter Spectacles. The problem they solve is that many optoelectronic materials often do not change state instantaneously and their response time is not fast enough for Continuous Adjustable 3Deeps spectacles. While frame-to-frame display of a motion picture may be 100 Hz (100 frames a second or 10 milliseconds per frame) a typical optoelectronic material made from electrochromic material may have a 'slow' response time and take several seconds to change from a clear state to a much darker state. Another problem addressed by multi-layered lenses is that of a limited 'cycle life' (number of clear-dark cycles) of some optoelectronic materials. Both of these problems can be addressed by using multiple layers of optoelectronic material in fabricating the lenses of the Continuous Adjustable 3Deeps Filter Spectacles, and a recent related patent discloses how to implement multi-layered lenses in the solution of these problems. Both problems relate to the viewing spectacle side of the solution that implements the already independently calculated optical density that maximizes the 3D Pulfrich stereoscopic illusion.

Now, before providing the detailed description of the invention, some additional pertinent background is provided

The Problem Addressed by the Current Patent Application

A common problem addressed in previous related patents is the determination of a single motion vector that characterizes the direction and speed of motion in a frame of a motion picture. This single motion vector is referred to in this patent application as the 'Characteristic 3Deeps Motion Vector'. Various methods have previously been described in related patent applications that calculate the 'Characteristic 3Deeps Motion Vector'.

One such method previously described calculates the 'Characteristic 3Deeps Motion Vector' in real-time directly from the digital images of successive frames. Still another previously described method pre-calculates the 'Characteristic 3Deeps Motion Vector' and embeds the information within the motion picture.

Another such method previously described in related patent applications uses video formatting technology, embodied in either software and/or hardware, to calculate the characteristic motion vector. Briefly, digital video monitors such as LCD TVs, plasma TVs, digital cinema projectors, etc., have hardware-based semi-conductor chips to handle the conversion of a digital video file to best fit the characteristics of the viewing monitor. As an example of this video formatting problem, consider the well-known motion picture "The Wizard of Oz", previously described. It is an example of calculating the 'Characteristic 3Deeps Motion Vector' from the set of motion vectors used to solved the video reformatting problem.

In the related patent application with application Ser. No. 12/274,752, now U.S. Pat. No. 7,604,348, "Continuous Adjustable 3deeps Filter Spectacles For Optimized 3deeps Stereoscopic Viewing And Its Control Method And Means" one calculation version of the calculation of the optical density of the neutral density filter was precisely stated as; "The algorithm fPrefEmb(Luminance, LatScrMotion) provides the computation of the optical density of the neutral density lens fPrefEmb(Luminance, LatScrMotion) and more detail is provided in FIG. 6." The focus of this patent application is another means to calculate the parameter "LatScrMotion" but now from digital video files in a compressed format. With the value "LatScrMotion", the methods of other related patent applications can then be used to compute the optical density of the neutral density lens that is optimal in that the 3D depth perception as viewed through the 3Deeps Filter Spectacles will be exactly the same as for normal human stereoscopic vision.

In this patent application the term "LatScrMotion" used in prior related patent applications is synonymous with the term "Motion Estimation Value" and "Characteristic 3Deeps Motion Vector".

This patent application discloses still another method to calculate the 'Characteristic 3Deeps Motion Vector'. Briefly, video compression is achieved in part, by calculating a set of motion vectors between frames, and this information can be used in turn to calculate the 'Characteristic 3Deeps Motion Vector'. The basic idea of video compression is to remove spatial area redundancy within a video frame (e.g. as done with Fax transmissions) and temporal redundancy between video frames. Since the successive frames in a video stream usually do not change much within small time intervals, the temporal redundancies can be used to encode and compress a video frame based on other video frames temporally (successively or previously) close to it.

As an example, MPEG compressed video files record a 16×16 pixel area (referred to as a macro block) of a frame of a motion picture, and then for successive frames only record a motion vector describing the motion of the macro block. In MPEG compression the motion vector has a horizontal and vertical part, each part ranging from −64 to +63 with a positive value indicating that the macro block moves to the right or downward respectively. Any macro block can move up to 64 pixels laterally and vertically between frames. (MPEG compression tracks not just rigid rotation but also macro block rotation.) High compression rates are achievable for moving pictures in part because the next successive frame of a motion video consists in the main of identical information. For instance, if the camera is fixed, the background information for a scene will be mostly identical between the frames of the scene. Most macro blocks will have an associated numerical motion vector indicating the macro block has not moved. In those cases where the macro block exhibits motion between frames, the macro block will have an associated numerical motion vector quantifying where the macro block has moved. In either case, only the motion vector needs to be recorded in the compressed file, not the redundant macro block. Software-based (e.g. Microsoft Media Player) and hardware-based (e.g DVD) video players can read a compressed file and decompress it back to a video stream for display on a monitor device for viewing. In this patent application, when the digital video file is decompressed, the pre-calculated motion vectors of all such macro blocks are used to calculate the 'Characteristic 3Deeps Motion Vector'.

This has great advantages over previously described methods since it relies on motion vector descriptors that are pre-calculated and stored in the compressed video file, and does not require real-time image processing.

This approach also solves an important implementation problem for 3Deeps. Many of the methods described in previous related patent applications cannot be easily implemented on some video devices. For instance, there is little need for a video format conversion chip on devices such as a PDA, iPOD, portable computer, portable DVD player, cell phones, etc, and such devices may not have the extra computer processing required for real-time image processing. But all these devices read, decompress and display video files in compressed formats, so the method of this patent application can be implemented with little additional overhead. As an example, the Apple iPod does not yet have the processing power for real-time video processing, nor does it have any need for expensive video formatting chips. But the Apple QuickTime format (.mov) uses the technique of temporal redundancies for video compression, allowing this invention to leverage the use of the already calculated motion vectors in the compressed QuickTime video file for control of 3Deeps viewing spectacles so 2D motion video may be viewed as 3D.

The above summary overview referred to MPEG and QuickTime compressed video files as two examples of video file formats that could be used by this invention. While the preferred embodiment of the invention will demonstrate the principle using just the MPEG format, it should be clearly understood that the principles disclosed in the invention could be used by any video compression technique that relies on temporal redundancies to calculate the 'Characteristic 3Deeps Motion Vector'.

Now, before providing the detailed description of the invention, some additional pertinent background is provided.

Video File Data Compression

Video compression refers to reducing the quantity of data used to represent digital video images, and is a combination of spatial image compression and temporal motion compensation. Compressed video can effectively reduce the bandwidth required to transmit video via terrestrial broadcast, via cable TV, or via satellite TV services.

Most video compression is lossy—it operates on the premise that much of the data present before compression is not necessary for achieving good perceptual quality. For example, DVDs use a video coding standard that can compress around two hours of video data by 15 to 30 times, while still producing a picture quality that is generally considered high-quality for standard-definition video. Video compression is a tradeoff between disk space, video quality, and the cost of hardware required to decompress the video in a reasonable time. However, if the video is over-compressed in a lossy manner, visible (and sometimes distracting) artifacts can appear.

Video compression typically operates on square-shaped groups of neighboring pixels, usually called macro-blocks. These pixel groups or blocks of pixels are compared from one frame to the next and the video compression records only the differences within those blocks. This works extremely well if the video has no motion. A still frame of text, for example, can be repeated with very little transmitted data. In areas of video with more motion, more pixels change from one frame to the next. When more pixels change, the video compression scheme must send more data to keep up with the larger number of pixels that are changing. If the video content includes an explosion, flames, a flock of thousands of birds, or any other image with a great deal of high-frequency detail, the quality will decrease, or the variable bitrate must be increased to render this added information with the same level of detail.

Video data contains spatial and temporal redundancy. Similarities can thus be encoded by merely registering differences within a frame (spatial), and/or between frames (temporal). Spatial encoding is performed by taking advantage of the fact that the human eye is unable to distinguish small differences in color as easily as it can perceive changes in brightness, so that very similar areas of color can be "averaged out" in a similar way to jpeg images. With temporal compression only the changes from one frame to the next are encoded as often a large number of the pixels will be the same on a series of frames.

One of the most powerful techniques for compressing video is interframe compression. Interframe compression uses one or more earlier or later frames in a sequence to compress the current frame, while intraframe compression uses only the current frame, which is effectively image compression.

The most commonly used method works by comparing each frame in the video with the previous one. If the frame contains areas where nothing has moved, the system simply issues a short command that copies that part of the previous frame, bit-for-bit, into the next one. If sections of the frame move in a simple manner, the compressor emits a (slightly longer) command that tells the decompresser to shift, rotate, lighten, or darken the copy—a longer command, but still much shorter than intraframe compression.

MPEG-1 Video Compression Standard

The Moving Picture Experts Group (MPEG) was formed by the International Organization for Standards (ISO) to set standards for audio and video compression and transmission. Its first meeting was in May 1988, and by 2005, MPEG included approximately 350 members per meeting from various industries, universities, and research institutions. MPEG's has developed several sets of standards referred to as MPEG-1, MPEG-2, MPEG-3 and MPEG-4, and is continuing to work on other video compression standards.

MPEG-1 is an ISO/IEC (International Organization for Standardization/International Electrotechnical Commission) standard for medium quality and medium bit rate video and audio compression. It allows video to be compressed by the ratios in the range of 50:1 to 100:1, depending on image sequence type and desired quality. The MPEG-1 standard is one of many video file compression technique that use spatial redundancy and temporal redundancy to reduce the size of the digital video file with little noticeable loss from the originally uncompressed digital version. The MPEG-1 standard is still widely used even though it is more than 15 years old is still widely used. The preferred embodiment of the invention will use the MPEG-1 video compression standard to demonstrate the principles of the invention. However, it should be clearly understood that the principles disclosed in the invention could be used by any video compression technique that relies on temporal redundancies, and the invention is not restricted to just MPEG-1 or other MPEG compression standards.

In MPEG-1, a video stream is a sequence of video frames. Each frame is a still image, and a video player decompresses an MPEG-1 bit stream and displays one frame after another to produce the motion video. When a motion video is compressed, MPEG-1 video compression removes both spatial redundancy within a video frame and temporal redundancy between video frames. The compression algorithms exploit several techniques to remove spatial redundancy but most importantly for this invention is its use of motion-compensation to remove temporal redundancy. Since the images in a video stream usually do not change much within small time intervals, and the idea of MPEG-1 motion-compensation is to encode a video frame based on other video frames temporally close to it.

Many of the important file compression strategies utilized by MPEG-1 are not used by the invention to calculate the 'Characteristic 3Deeps Motion Vector'. These include but are not limited to Discrete Cosine Transformation (DCT), run-level coding, Huffman coding, zig-zag scanning, Chroma subsampling, etc. These strategies for digital file compression are well-known in the art, but are not used by the invention to calculate the 'Characteristic 3Deeps Motion Vector'. The following discussion focuses on an explanation of the MPEG-1 motion compensation temporal redundancy techniques that are used by the invention to calculate the 'Characteristic 3Deeps Motion Vector' for each frame of the motion picture.

A MPEG-1 compressed digital file is a sequence of three kinds of frames: an I-frame, a P-frame, and a B-frame. The I-frames are intra-coded, i.e. they can be reconstructed without any reference to other frames. The P-frames are forward predicted from the last I-frame or P-frame, i.e. it is impossible to reconstruct them without the data of another frame (I or P). The B-frames are both forward predicted and backward predicted from the last/next I-frame or P-frame, i.e. there are two other frames necessary to reconstruct them. P-frames and B-frames are referred to as inter-coded frames.

Whether a frame of video is coded as an I-frame, P-frame, or B-frame, the frame is processed as micro-blocks. A micro-block is a square array of 16×16 pixels, and is the unit for motion-compensated compression. If a video frame has a resolution of 320×240 pixels the MPEG-1 bit stream will reference this frame with respect to 20×15=300 macro-blocks.

An I-frame is encoded as a single image, with no reference to any past or future frames. The encoding scheme used is similar to JPEG compression. Each 8×8 block is encoded independently with one exception explained below. The block is first transformed from the spatial domain into a frequency domain using the DCT (Discrete Cosine Transform), which separates the signal into independent frequency bands. Most frequency information is in the upper left corner of the resulting 8×8 block. After this, the data is quantized. Quantization can be thought of as ignoring lower-order bits (though this process is slightly more complicated). Quantization is the only lossy part of the whole compression process other than subsampling. The resulting data is then run-length encoded in a zig-zag ordering to optimize compression. This zig-zag ordering produces longer runs of 0's by taking advantage of the fact that there should be little high-frequency information (more 0's as one zig-zags from the upper left corner towards the lower right corner of the 8×8 block). The afore-mentioned exception to independence is that the coefficient in the upper left corner of the block, called the DC coefficient, is encoded relative to the DC coefficient of the previous block (DCPM coding).

A P-frame is encoded relative to the past reference frame. A reference frame is a P- or I-frame. The past reference frame is the closest preceding reference frame. Each macro-block in a P-frame can be encoded either as an I-macro-block or as a P-macro-block. An I-macro-block is encoded just like a macro-block in an I-frame. A P-macro-block is encoded as a 16×16 area of the past reference frame, plus an error term. To specify the 16×16 area of the reference frame, a motion vector is included. A motion vector (0, 0) means that the 16×16 area is in the same position as the macro-block we are encoding. Other motion vectors are relative to that position. Motion vectors may include half-pixel values, in which case pixels are averaged. The error term is encoded using the DCT, quantization, and run-length encoding. A macro-block may also be skipped which is equivalent to a (0, 0) vector and an all-zero error term. The search for good motion vector (the one that gives small error term and good compression) is the heart of any MPEG-1 video encoder and it is the primary reason why encoders are slow.

A B-frame is encoded relative to the past reference frame, the future reference frame, or both frames. The future reference frame is the closest following reference frame (I or P). The encoding for B-frames is similar to P-frames, except that motion vectors may refer to areas in the future reference frames. For macro-blocks that use both past and future reference frames, the two 16×16 areas are averaged.

The MPEG-1 bit stream for both P-frames (forward predicted), and B-frames (forward and backward predicted) have motion vectors explicitly or implicitly associated with each macro-block. A P-frame of the motion video file with a resolution of 320×240 may have as many as 300 motion vectors describing the movement of the macro-blocks from the most recent I-frame or P-frame. A B-frame of the motion video file will similarly have up to 300 motion vectors describing the movement of the macro-blacks from last/next I-frame or P-frame.

As an example, consider a single macro-block. A following P-frame shows the same triangle but at another position. Prediction means to supply a motion vector that determines how to move the macro-block from an I-frame to the P-frame. This motion vector is part of the MPEG stream and it is divided in a horizontal and a vertical part. These parts can be positive or negative. A positive value means motion to the right or motion downwards, respectively. A negative value means motion to the left or motion upwards, respectively. The parts of the motion vector are in the range of −64 . . . +63. So the referred area can be up to 64×64 pixels away.

An I-frame is intra-coded and cannot refer to another frame so it cannot have any motion vectors. However, the inter-coded P-frames and B-frames have motion vectors for each macro-block and are used by this invention to calculate for their respective frames the 'Characteristic 3Deeps Motion Vector' necessary to calculate the optical densities of the lenses of the 3Deeps Filter Spectacles.

Calculation of the Motion Estimation Value

FIG. 1 is a block diagram 100 showing the calculation of the motion estimation value for a frame of a digital video file. It shows the main principle of the invention which is that during digital video decompression 104, the motion vector information 103 (also called motion compensation information) in a compressed digital video file 101, can be processed on a frame-by-frame basis, and an algorithm 105 used to calculate the motion estimation summary 109 value necessary to control the optical densities of the lenses of 3Deeps Filter Spectacles.

The block diagram 100 shows a digital video file 101 read by a digital video decompression program 104. Only two types of information in the digital video file are shown, the frame number labeled 'fr-#' and the set of motion vectors labeled ' {mv(s)}' It is a set of motion vectors since there may be several motion vectors per frame—one for each macro-block. To simplify the presentation, the algorithms described in FIGS. 3, 4, and 5 will focus on the calculation of the motion estimation value 110 from the set of motion vectors 103, also denoted ' {mv(f)}' of the f-th frame 102. The Digital Video Decompression analysis program 104 reads the compressed digital video file 101 and on a frame-by-frame basis accesses the set of motion vectors 103. A motion estimation algorithm 105 'ME Alg' takes as input the set of motion vectors for the f-th frame 103, and calculates the motion estimate value for the f-th frame 110. For each frame of the motion video, the motion estimation value may be either stored for later use, and/or transmitted in real-time for control of the 3Deeps filter spectacles. FIG. 1 shows the values being stored in a buffered area or data output file 107. The structure 107 has two fields—a frame number 108, and the motion estimation value 109. For the f-th frame the motion estimation value is stored along with the frame number 110.

Figure 4:
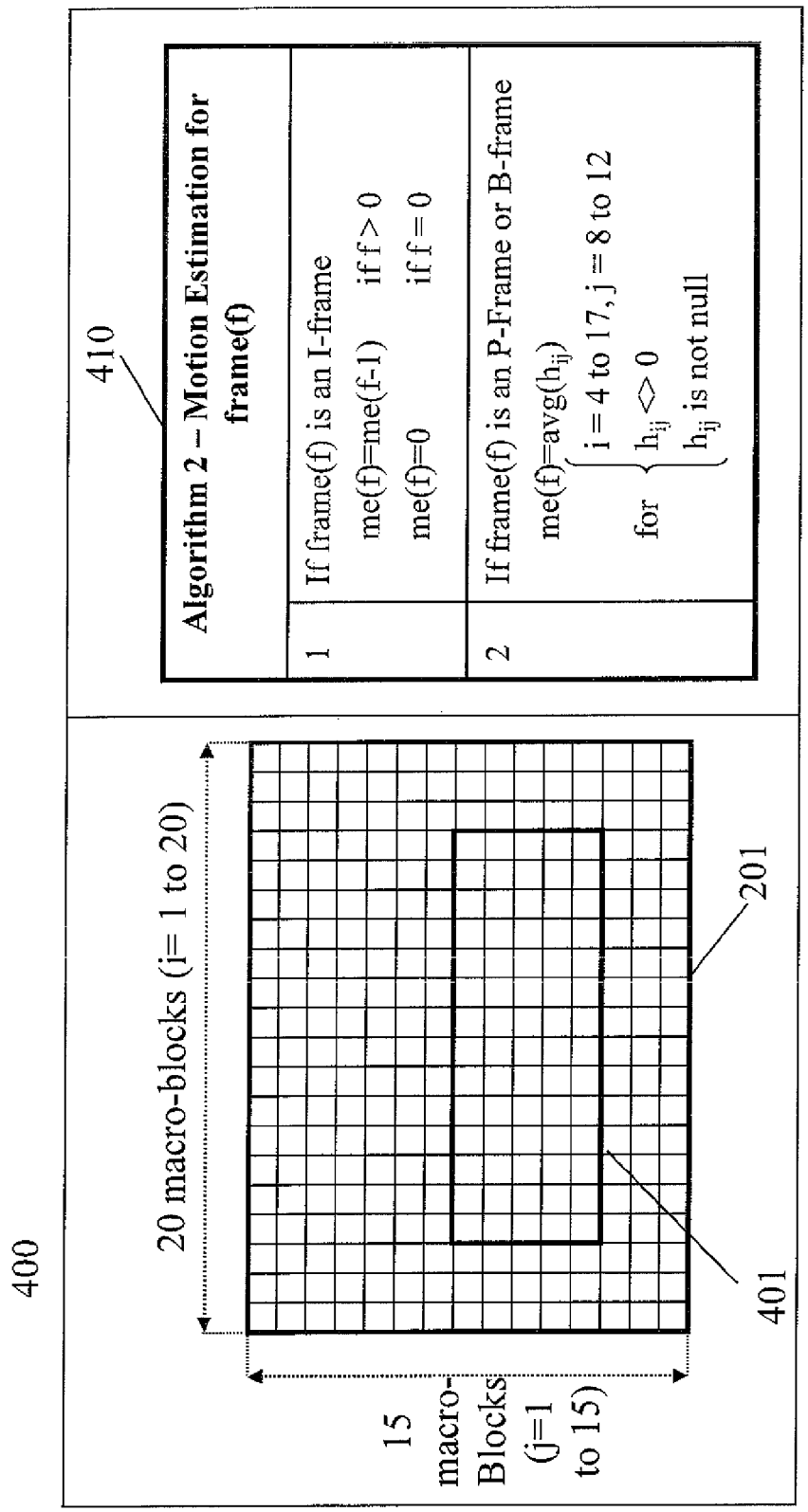
FIG. 4 is a second algorithm used by the preferred embodiment of the invention to calculate the Motion Estimation value for a frame of a digital video file in the MPEG-1 compression format.
Figure 5:
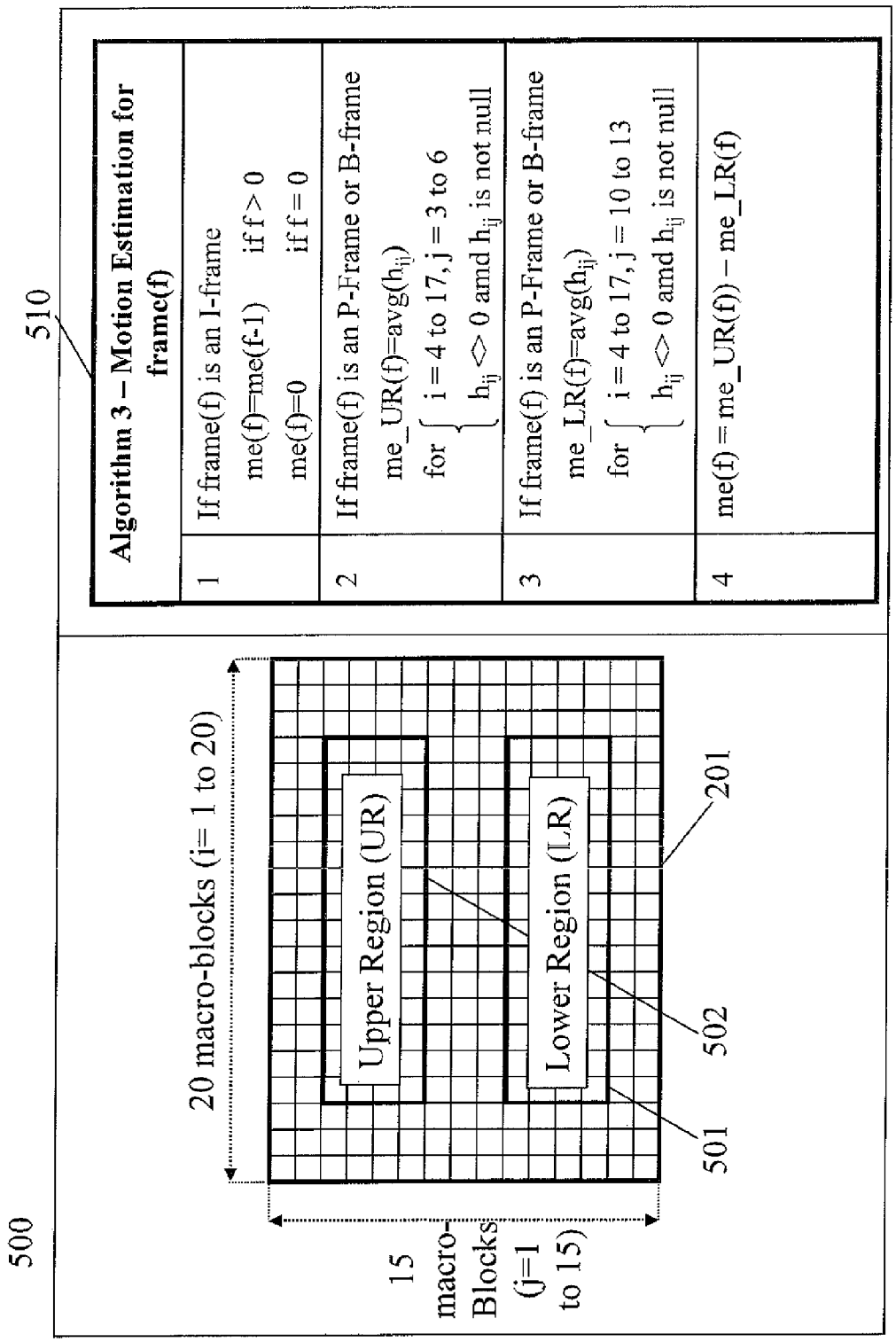
FIG. 5 is a third algorithm used by the preferred embodiment of the invention to calculate the Motion Estimation value for a frame of a digital video file in the MPEG-1 compression format.

Three different algorithms are presented for motion estimation in FIG. 3, FIG. 4, and FIG. 5. In each, the motion estimation value 110 associated with the f-th frame is a signed numeric value ranging from −64 to +63. A positive value means motion to the right or motion downwards, respectively. A negative value means motion to the left or motion upwards, respectively.

During the Digital Video Decompression 104 the decompressed video file 106 for display may also be created. However, the principles of this invention can be used to estimate frame-by-frame motion estimation values 110 without also creating the decompressed video file 106. This would be useful for creating the motion estimation values that would then be embedded into the video file as has been described in previous related patents.

Figure 2:
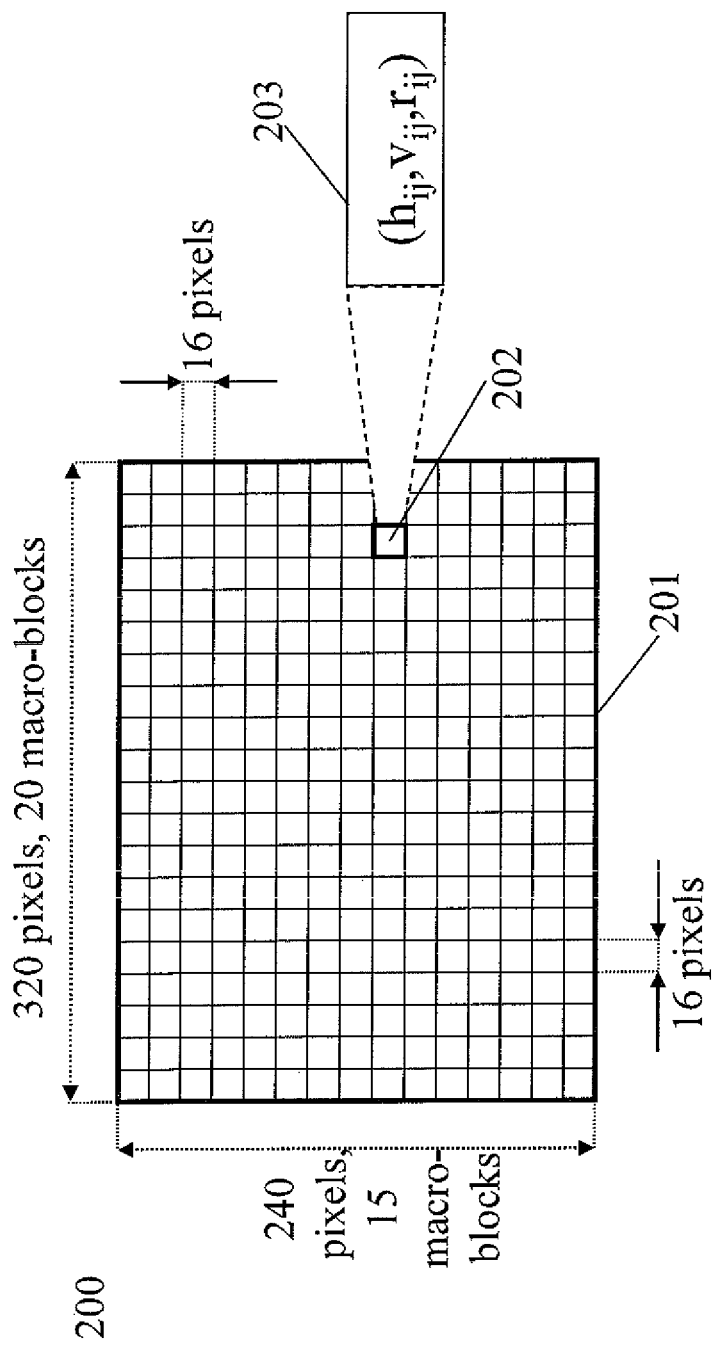
FIG. 2 is pictorial representation of a frame of a digital video file in the MPEG-1 compression format.

FIG. 2 is pictorial representation 200 of a frame 201 of a digital video file in the MPEG-1 compression format. For this exemplary discussion, a moving picture resolution of 320 pixels×240 pixels is assumed, but neither this invention nor MPEG-1 digital video compression are restricted to such size. MPEG-1 looks at a frame of a digital motion picture as square groups of block of pixels called micro-blocks. Each micro-block has a size of 16 pixels by 16 pixels. For this example then the frame of digital motion video is 20 macro-blocks in width by 15 micro-blocks in height for a total of 300 macro-blocks. For this preferred embodiment of the invention we only use the macro-block motion compensation or motion vector information, which is shown in a blow-up 203 of a single macro-block 202 of the frame. The motion vector information includes the lateral or horizontal component of the motion vector (hij) of the macro-block, the vertical component of the motion vector (vij) of the macro-block, and the rotation of the macro-block (rij). While the three different exemplary algorithms described for motion estimation in FIG. 3, FIG. 4, and FIG. 5 only use the horizontal component of the motion vector (hij), other embodiments may also utilize the quantified temporal redundancy macro-block information from the vertical component of the motion vector (vij), and the rotation of the macro-block (rij).

FIG. 3 is a first algorithm 300 used by the preferred embodiment of the invention to calculate the Motion Estimation value 110 for a frame of a digital video file in the MPEG-1 compression format. It only uses the horizontal or lateral component of the motion vector and takes the average over all 300 macro-blocks of the frame of the exemplary.

It should be understood that the motion compensation information for a macro-block may not always describe the motion of the macro-block. In one circumstance, if the compressed frame of the video is an I-frame, the frame is described without any reference to other temporally near blocks, and in that case there is no motion vectors associated with the frame, so no 'Characteristic 3Deeps Motion Vector' can be estimated for that frame. In another circumstance the frame may be a P-frame or a B-frame that utilizes motion prediction, but may lack some information to optimally calculate the 'Characteristic 3Deeps Motion Vector'. If motion is too complicated for the compression program, it may encode individual macro-blocks as it does I-block macro-blocks. In that case there is no information regarding the movement of the block and for the purposes of this patent disclosure it is termed as null—since there may or may not motion of the macro-block and it is not estimated in the MPEG-1 bit-stream. Also, in many instances the motion predictive information of P-frame or a B-frame will simply have a (0,0) horizontal and vertical value as for all macro-blocks that are part of a non-moving background. In the exemplary algorithms of FIG. 3, FIG. 4, and FIG. 5 these are ignored.

FIG. 3 shows the f-th frame 201 of the compressed digital video file 101. It is 20 macro-blocks wide and has a height of 15 macro-blocks. All of the non-zero and non-null macro-blocks motion vectors will be averaged and used to calculate the motion estimate value for the f-frame. The motion estimation for frame f, also called the 'Characteristic 3Deeps Motion Vector' is denoted as me(f)).

Algorithm 1 for motion estimation of frame(f) 310 reads the digital bit-stream of the MPEG-1 file and accesses the motion vector information for each macro-block. If the frame is an I-frame then the motion estimation value is set to the same motion estimation value as for the previous frame. For the first frame of the movie—which will always be an I-frame—the motion estimation value is set to '0'. If the frame is a P-frame or a B-frame, the motion estimate value (me(f) is set to the average of all horizontal components of macro-block of that frame, but only for those horizontal components that are non-zero, and not-null.

FIG. 4 is a second algorithm 400 used by the preferred embodiment of the invention to calculate the Motion Estimation value for a frame of a digital video file in the MPEG-1 compression format. FIG. 4 shows the f-th frame 201 of the compressed digital video file 101. It is 20 macro-blocks wide and has a height of 15 macro-blocks. In this second algorithm, only macro-blocks in the center of action associated with the foreground of the motion video will be averaged and used to calculate the motion estimation value for the f-frame.

Algorithm 2 for motion estimation of frame(f) 410 reads the digital bit-stream of the MPEG-1 file and accesses the motion vector information for each macro-block. If the frame is an I-frame then the motion estimation value is set to the same motion estimation value as for the previous frame. For the first frame of the movie—which will always be an I-frame—the motion estimation value is set to '0'. If the frame is a P-frame or a B-frame, the motion estimate value (me(f) is set to the average of all horizontal components of macro-block of that frame, but only for those horizontal components that are within the region associated with the center of action associated with the foreground. Any macro-blocks outside this area will be ignored. As with the first algorithm, only the non-zero and non-null motion vectors are included in the averaging process.

FIG. 5 is a third algorithm 500 used by the preferred embodiment of the invention to calculate the Motion Estimation value for a frame of a digital video file in the MPEG-1 compression format. FIG. 5 shows the f-th frame 201 of the compressed digital video file 101. It is 20 macro-blocks wide and has a height of 15 macro-blocks. In this algorithm we identify and Upper Region (UR) 502 that provides a surrogate for the background, and a Lower Region (LR) 501 that provides a surrogate for the foreground. The motion is in each block is calculated and then the difference between them provides an estimate of the motion estimate for frame f denoted as me(f)).

Algorithm 3 for motion estimation of frame(f) 410 reads the digital bit-stream of the MPEG-1 file and accesses the motion vector information for each macro-block. If the frame is an I-frame then the motion estimation value is set to the same motion estimation value as for the previous frame. For the first frame of the movie—which will always be an I-frame—the motion estimation value is set to '0'. If the frame is a P-frame or a B-frame, the motion estimate value (me(f) is calculated in the following manner. All macro-blocks in the Upper Region 502 that are non-zero and non-null are averaged to get a surrogate measure of the background motion denoted as me_UR(f). Also, all macro-blocks in the Lower Region 501 that are non-zero and non-null are averaged to get a surrogate measure of the foreground motion denoted me_LR(f). The motion estimate for the f-th frame is then calculated as the difference between the Upper Region calculation and the Lower Region—that is me(f)=me_UR (f)−me_LR(f). All macro-blocks outside the Upper Region and the Lower Region will be ignored. As with the previous algorithms, only the non-zero and non-null motion vectors are included in the averaging process.

Another Algorithm

Previous related patent applications have provided different algorithmic approaches for the calculation of the optical density of the neutral density filter. More specifically, in the previous patent application with application Ser. No. 12/274,752, now U.S. Pat. No. 7,604,348, "Continuous Adjustable 3Deeps Filter Spectacles For Optimized 3deeps Stereoscopic Viewing And Its Control Method And Means" several versions of an algorithm to calculate the optical density of the neutral density filter were provided as fPrefEmb (Luminance, LatScrMotion)—in which the optical density could be calculated from a 'Luminance' and a 'LatScrMotion' measure. The previous section detailed a new approach to the calculation of "LatScrMotion" also called the Motion Estimation or 'Characteristic 3Deeps Motion Vector'. This section details a new algorithmic for calculating the optical density of the neutral density filter that also requires a third input parameter—the number of monitor pixels that represent a real distance of 2½ inches and that is denoted the filmed-distance-metric and the algorithm is denoted as $f_{PrefEmb}$(Luminance, LatScrMotion, filmed-distance-metric).

A previous related patent application showed how to use the retinal reaction time curve to calculate an optical density for the controllable neutral density filter that optimizes the Pulfrich illusion. A calculation algorithm $f_{PrefEmb}$(Luminance, LatScrMotion) was provided depending upon Luminance, and Lateral Screen Motion (LatScrMotion). In this embodiment the calculation will also depend on a size measure (termed the filmed-distance-metric) that is the number of pixels that represents a measurement of 2½ of the image.

Figure 6:
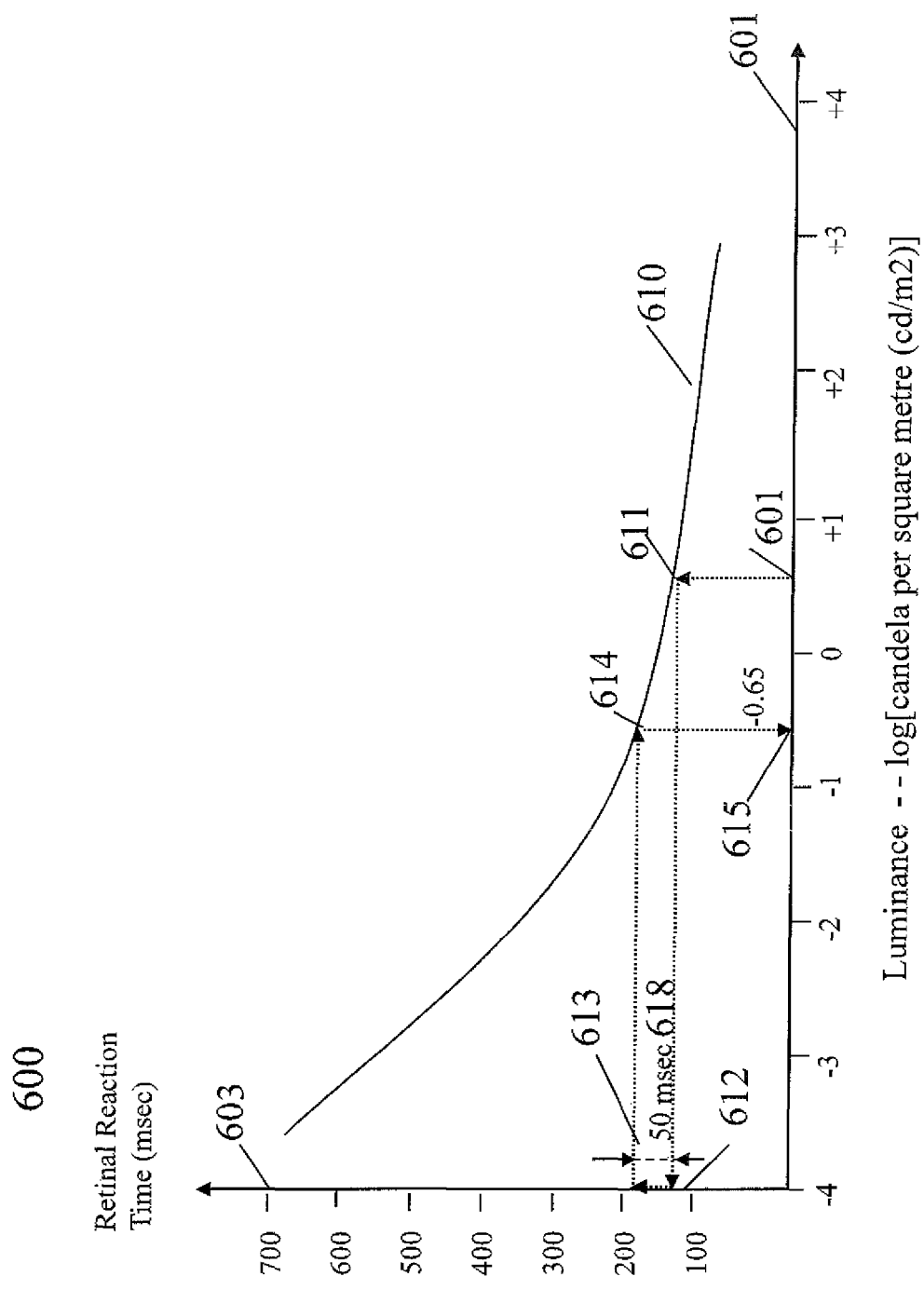
FIG. 6 uses the typical curve of retinal reaction time as a function of luminosity to demonstrate how to compute from a motion vector, luminosity and a size measure the optimal optical density for the neutral density lens of 3Deeps Filter Spectacles so that the difference in retinal reaction time between the viewer's eyes results in instant and lagging images that correspond to a separation of 2½ inches.

FIG. 6 uses the typical curve of retinal reaction time as a function of luminosity to demonstrate how to compute from a motion vector, luminosity and the size measure, the optimal optical density for the neutral density lens of 3Deeps Filter Spectacles so that the difference in retinal reaction time between the viewer's eyes results in instant and lagging images that correspond to a separation of 2½ inches. The difference between the previously shown algorithm and the algorithm presented in this embodiment is that the previous algorithm used a measurement of 2½ on the monitor, while this preferred embodiment uses a measure of the number of pixels in 2½ inches in the image.

In a preferred embodiment of that previous related patent application, it was shown how to control Continuous Adjusting 3Deeps Filter so as to provide a neutral density filter that has an optical density so that the distance between the lagged image that is seen by the eye obstructed by the neutral filter, and the image seen by the unobstructed image, is 2½ inches. This distance, 2½ inches, is the average distance between a viewer's eyes—also called the inter-ocular distance. That is, the optical density of the neutral filter is chosen dependent on (1) speed of motion on the screen, (2) the luminance reaching the unobstructed eye, and (3) so that the delayed image from the filtered eye appears 2½ inches behind image from the unfiltered eye.

However, that algorithm only provided an instant and lagging image that are separated by 2½ inches of monitor distance—not 2½ inches of filmed distance. By monitor distance we refer to measurement on the monitor screen. If a monitor has a resolution of 72 pixels per inch, then 2½ inches is 180 pixels. By size of a filmed distance we refer to a real distance as displayed on a monitor. As an example, we know the average distance between a viewer's eyes is 2½ inches—the inter-ocular distance. The distance between a person's eyes does not change whether they are filmed 10 feet or 20 feet from the camera, but the monitor distance in displaying that same face will require fewer pixels if the person is filmed 20 feet away from the camera rather than 10 feet away from the camera. That is—if the camera is focused face-on on a person who is 20 feet from the camera, then the filmed difference between that person's eyes will not be considerable less than 2½ inches of monitor distance. The new algorithm herein described will provide instant and lagging images to give a separation of 2½ inches of filmed distance—not monitor distance.

This number, 2½ inches, is also the 'magic number' used in other 3D viewing systems. Cameras for recording dual-image 3D systems that are viewed using anaglyph spectacles, shutter-glasses, IMAX, or Polaroid spectacles use cameras with lenses that are lashed together to have a separation of approximately 2½ inches between the lenses that record same scene 'right-eye' and 'left-eye' images. Of the hundreds of dual lens 3D still and moving picture cameras that have been produced for more than 100 years all have 2 lenses, one each for filming a right eye and a left eye image, and the lenses, and what the cameras have in common is that the two lenses are fixed and laterally separated by 2½ inches.

Geometrically, in normal stereoscopic vision the eyes, separated by the inter-ocular distance, triangulate on an object. In this embodiment of the invention each eye sees instant and lagging images separated by the filmed inter-ocular distance and the mind triangulates to get a stereoscopic eye image. In this embodiment of the invention we have the same triangulation and geometry so the 3Deeps visualization is what the mind expects to see, and thus 3Deeps should provide a perception that is entirely natural, and even more realistic than the algorithms described in previous related patent applications.

FIG. 6 600 uses the typical curve 610 of retinal reaction time 603 as a function of luminosity 601 to demonstrate how to compute from three input parameters termed a motion vector, luminosity, and also a filmed-distance-metric measure, the optimal optical density for the neutral density lens of the 3Deeps Filter Spectacles. This provides for a difference in retinal reaction time so that the instant and lagging images correspond to a separation of 2½ inches in real distance. The figure describes an algorithm with 3 parameters $f_{PrefEmb}$(Luminance, LatScrMotion, filmed-distance-metric) that has luminance; a motion vector as input (negative value for right-to-left lateral motion and a positive value for left-to-right lateral motion; and, a filmed-distance-metric that gives the number of on-monitor pixels that corresponds to a real distance of 2½ inches. For instance, if the camera films a person head-on from a distance of 10 feet, then the number of monitor pixels between the center of their eyes may be 100 pixels, whereas if the camera films a person head-on from a distance of 20 feet, the number of monitor pixels between the center of their eyes will be a markedly smaller number.

The algorithm for $f_{PrefEmb}$(Luminance, LatScrMotion, filmed-distance-metric) is now described in words. First we measure the ambient luminance or brightness 601. This is the first input parameter. Luminance represents the amount of light that the unaided eye will see through the clear lens. Using the retinal reaction time curve 610 we can establish the retinal reaction time delay. In our example we have an input luminance measure 601 of 0.52 cd/m2, that from the retinal reaction time curve 610 corresponds 611 to a retinal reaction time delay 612 of 120 msec. The second input parameter is the speed of lateral motion. For this example we assume a left-to-right lateral screen motion of 100 pixels (dots) per frame. That is LatScrMotion=100 pixels/frame. If the focus of the scene is on an object that for which 2½ inches takes up 300 pixels on the monitor (filmed-distance-metric=300 pixels) then it will take exactly 3 frames for the major object on the screen to move 2½ inches. In this case then we want to select a retinal reaction delay for the opposing eye so that the lagged image is the third frame image.

If the TV has a refresh rate of 60 Hz (60 frames per second) then it will take 3/60=1/20 or approximately 50 msec for the screen object to traverse 2½ inches. That is, we want the retinal reaction time difference 618 between the two eyes to be 50 milliseconds. Adding the 50 msec to 120 msec computes to 170 msec retinal reaction time 613 to affect a 50 millisecond retinal reaction time difference 618 between the two eyes. Now going back to the intercept 614 on the retinal reaction curve 610 we see that we need to choose an optical density for the neutral density lens that will give us a luminance reading 615 of about −0.65 on the luminance scale. If the direction of the lateral motion is from left-to-right, the right lens will take this optical density and the right lens will be clear.

While the image processing or other methodology to determine the filmed-distance-metric is out of the scope of this patent application, it should be recognized that this is not an insoluble problem and much work has been done on it.

Autofocus has long been a feature of digital cameras. Autofocus requires determination of the distance between the lens of the camera and the center of focus of the picture so that the proper lens may be used to record the digital picture. But determination of the distance from the camera to the focal setting object is sufficient to determine filmed-distance metric.

More important for a 3Deeps system is the body of existing and future research into face recognition. Face recognition systems used in surveillance systems which can focus on the face of an individual in a crowd, digitize the image, and then run the image through the database to find a match and identify the person. For the 3Deeps filmed-distance-metric we have an easier problem in that all we need to do is identify a face in a digitized image, identify the eyes of the individual, and then measure the number of pixels between the center of the eyes.

In other cases, live presentations allow the determination of the distance from the camera to the focus of the scene. This allows the precise calculation of the filmed-distance-metric. For instance, sports such as football or basketball rely on cameras that are fixed in place. For sports action on any part of the playing field it can be readily determined the distance between the camera and the focus of action. This can be used in turn to determine the filmed-distance-metric for the 3Deeps Filter Spectacle algorithm.

The 3Deeps algorithm can use any of these methods, or methods that may result from future research to provide a determination of the filmed-distance-metric for use as input in the algorithm.

Regardless of the method used to determine or estimate any of the luminance or brightness, filmed-distance-metric, or the Characteristic 3Deeps Motion Vector' what is required is that the apparatus that determines these values transmits them to the 3Deeps Viewing Spectacles. The controller of the 3Deeps Viewing Spectacles can then use them to determine the optimal optical density for the lenses of the 3Deeps Viewing Spectacles. The 3Deeps viewing spectacles will receive the values, pass them to the 3Deeps Viewing Spectacles Controller, and the controller will then use the Retinal Reaction Curve, and the Operating Characteristics of the optoelectronic material used to fabricate the lenses of the 3Deeps Viewing Spectacles to produce the electrical signalization that control the 3Deeps Viewing Spectacles in synchronization to the motion picture.

Figure 7:
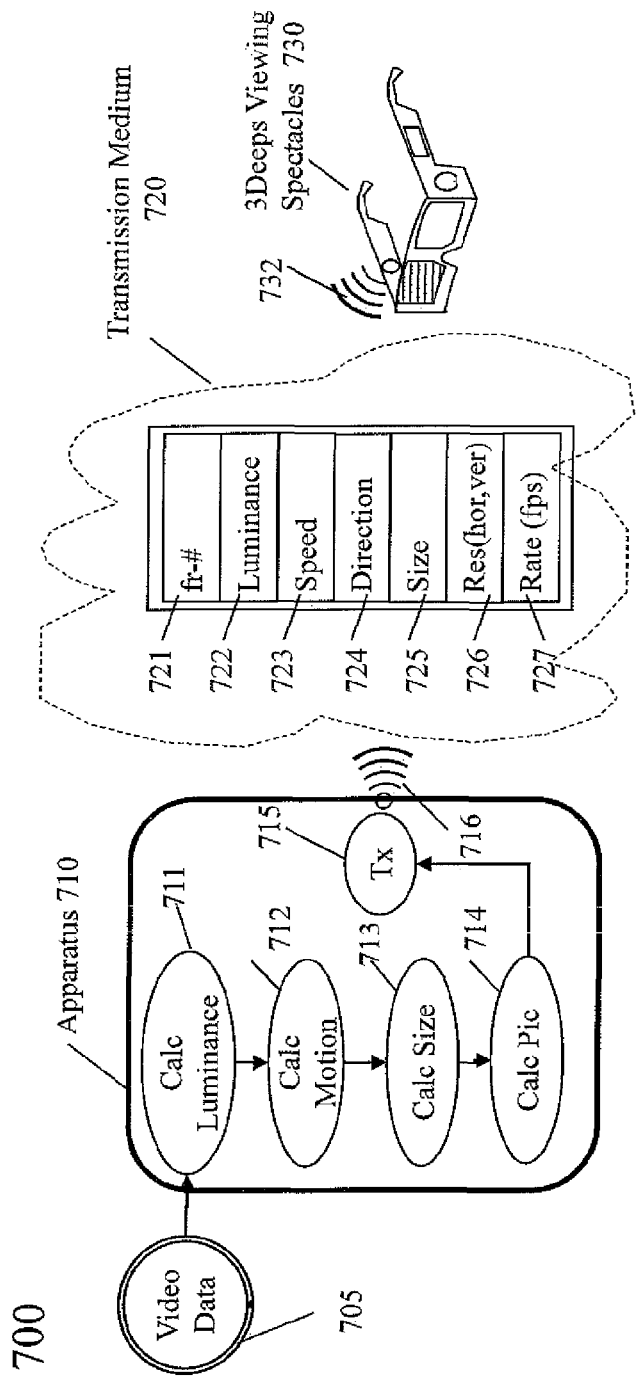
FIG. 7 is a block diagram of the 3Deeps system

FIG. 7 is a block diagram 700 of the 3Deeps system. It shows all the components necessary to produce the synchronization signals for the 3Deeps Viewing Spectacles so video shot in 2D can be viewed in 3D. The Apparatus 710 reads the digital video file 705. The digital data file 705 may be in a compressed format stored on a permanent media such as a DVD or VCR tape. Or the digital data file 705 may be in a broadcast format as with Cable TV, or broadcast TV signal. In still another instance, the digital data file may be a digital data file that is downloaded before playing. These are only examples of the forms of the digital data and other format or mediums may be used.

The digital data file 705 is read by a 3Deeps Apparatus 710 that processes the Video data 705 and calculates all the parameters necessary to control the 3Deeps Viewing Spectacles 730. This patent application, and previous related patent applications have disclosed different algorithms that use different sets of the parameters to calculate the 3Deeps control synchronization control signals. Any of those the algorithms described in preferred and alternate algorithms could be used as well as any other algorithm to calculate the 'Characteristic 3Deeps Motion Vector'. The apparatus 710 will need to calculate the luminance of a frame of video in a processing step 'Calc Luminance' 711, calculate the 'Characteristic 3Deeps Motion Vector' in a processing step 'Calc Motion' 712, and then calculate the size or filmed-distance-metric in a processing step 'Calc Size' 713. Finally, the frame rate and resolution of the motion video are provided in a processing step 'Calc Pic' 714. The values of these parameters are transmitted by an electronic component 'Tx' 715 in the Apparatus 710, with a signal 716 carrying the information for the parameters. A variety of methods by which these parameters are calculated have been described in previous related patent applications as well as in this patent application, and any of them may be used.

A multiplicity of methods have been disclosed in this patent application and prior related patent applications to calculate the parameters necessary to control the 3Deeps Viewing Spectacles. Luminance or brightness for a frame of the movie may be calculated directly from the digital representation of the frame. In some embodiments it may also be useful to include the ambient light of the viewing venue, or the luminance may be either partially or wholly measured by a photodiode on the frame of the 3Deeps spectacles.

The characteristic motion in a frame of the motion picture may be measured by image processing means that use edge-finding algorithms, block approaches, or other means to process a sequence of images of the motion picture to determine the direction and speed of lateral motion. While 3Deeps can perform its own calculations to determine a characteristic motion vector, 3Deeps may alternately use the motion compensation information of video format conversion chips to estimate the motion vector, or it may use the motion vector information in compressed digital video files to estimate the motion vector. The determinant of which method will often depend upon the implementation of 3Deeps. As an example, video format conversion chips are not used on a Personal computer, cell phone, or Personal Data Assistant, and so the 3Deeps characteristic motion vector cannot be calculated by such means on those apparatus. But such apparatus typically play motion video delivered in compressed format, and the use of the method described in this patent application may be used for such apparatus. Video format conversion chips are an important engine of Digital TVs and Digital Cinema projectors and systems and so the method of using the motion compensation vectors developed by such chips may be used with those apparatus to implement 3Deeps. In some cases, such as the Phenomenoscope embodiment of 3Deeps and that is described in a prior related patent application, the motion vectors would be determined by direct image processing of a sequence of images.

It is also noteworthy that some of the 3Deeps control algorithms only require direction of motion—not speed of motion—so it may not be necessary to accurately determine the characteristic speed of lateral motion, only the direction of the lateral motion that characterizes a frame of the video.

In some embodiments of the invention, the 3Deeps lens control algorithm requires a measure of the number of pixels of video that represent 2½ inches of filmed space—the 'filmed-distance-metric'. This is measured by image processing to identify some known object in the frame of the film. For instance, the art of digital face recognition may be used to determine a face in the frame, and then determine the location of the eyes on that face, and then provide a measure of the distance (number of pixels) between the eyes. Since the average interocular distance is 2½ inches this would suffice. Other methods to determine the size would be from the placement of the camera providing a distance between the lenses of the recording camera and the focus of the action. This is a useful method for instance in sporting events where the camera is a fixed recording location and include sporting events such as basketball, football, and baseball.

The values of the picture resolution may be determined by various means. The picture resolution measures that include the horizontal and vertical picture resolutions and the frame rate have to be measured in the same units as the speed and size. If the motion vector is determined, for instance, from a compressed digital video file as described in the patent application, then the size and frame rate may be the set to the values of the input video data. If however the motion vector is determined by means of a video format conversion chip, the output picture will be resized and reformatted by the video format conversion chip and so should match the resolution of the output format.

The partial list of the electronic devices that may house the Apparatus 710 include a DVD player, Personal Digital Assistant, iPod like device, cell phone, Digital Video Recorder (DVR), Tivo, Video upconverter, digital motion picture projector system, portable DVD player, portable video projector, Personal computer, Digital TV, or may even be housed within the 3Deeps Viewing Spectacles.

The parametric information that is generated by the Apparatus 710 includes a reference frame number 'fr-#' 721; the luminance associated with the frame 'Luminance' 722; the speed of lateral motion 'Speed' 723; the direction of lateral motion 'Direction' 724; the size or 'filmed-distance-metric' that has been previously described as the number of pixels that represent 2½ inches and is transmitted as the value 'Size' 725; the resolution of the video in pixels 'Res' 726 with two value representing the horizontal and vertical resolution; and, the frame rate of the digital movie 'Rate' 727 in frames per second. All the values 'Speed' 723, 'Size' 725, and resolution 'Res' 726 are in the same measurement units. The parametric values are transmitted by a medium 720 to the 3Deeps Viewing spectacles. The medium 720 is preferably by wireless medium, but may be over a wired medium.

The parametric values are transmitted to the 3Deeps Viewing Spectacles 730 that have means to receive 732 the parameter values. Different versions of viewing spectacles including 3Deeps Viewing Spectacles, Continuous Adjustable 3Deeps Viewing spectacles, multilayered 3Deeps viewing spectacles, 3Deeps Phenomenoscope, and multiuse 3Deeps Viewing spectacles have been described in previous related patent applications, and any of these would suffice. As described in previous related patent applications, the 3Deeps viewing spectacles 730 have electronic components to receive the parameters and pass the values on to a processing unit. The processing unit, parses the values, and implements an algorithm using the retinal reaction time curve, operating characteristics of the optoelectronic material used to fabricate the lenses of the 3Deeps Viewing Spectacles 730 to determine the optical density of the right and left lenses of the 3Deeps Viewing Spectacles. There is also electronic circuitry included on the 3Deeps viewing spectacles 730 to cause the lenses to take the calculated optical densities.

The various embodiments of the 3Deeps viewing spectacles may receive the parametric values by wired or wireless means. Wireless means include infrared, or radio frequency means such as bluetooth signalization or custom designed wireless handshaking standards. The lenses of the 3Deeps viewing spectacles may be fabricated from any optoelectronic material or any material that provides precise electronic control over the amount of light transmission, including but not limited to electrochromic devices, suspended particle devices, and polymer dispersed liquid crystal devices electrochromic devices.

Finally, the control unit on the various embodiments of the 3Deeps spectacles may implement any of the control algorithms described in this or prior related patent applications. The choice of controlling algorithm that is implemented may even be switch selectable or electronically selectable by a control parameter not shown in FIG. 7. The controlling algorithm may ignore some of the transmitted parameters. In the case of the 3Deeps Phenomenoscope, no transmitted parameters are necessary, so the 3Deeps Phenomenoscope does not require the Apparatus 710, or the transmitted parameters. If the 3Deeps Viewing Spectacles include a photodiode or some other means to determine the brightness of light at the spectacles then the Luminance measure may be ignored by the control unit control algorithm, or the two brightness measures may be used together by the control unit control algorithm.

Other Embodiments

Other embodiments may also use other temporal redundancy information to extract a motion estimation value, including for the vertical component of the motion vectors, and rotation information of the motion vectors.

Sensitivity of 3Deeps to the Optimal Settings

The 3Deeps system for converting 2D motion pictures for viewing as 3D is not sensitive to the optimal optical density settings of the lenses, and sub-optimal settings will produce a similar 3D experience for the viewer. While an algorithm to control the lenses of the 3Deeps viewing spectacles that optimizes the Pulfrich illusion has been described, algorithms that use sub-optimal settings can be substituted. What is important is that the motion-directed eye have a darker lens than the opposite eye, and that the darker shading for the lens of the motion-directed eye be chosen to approximate the target difference given by the use of the retinal reaction curve.

As an example if calculations show that the optimal setting of the darker lens of a 3Deeps spectacle should be set to allow 50% transmission of light, the sense of 3D depth will be unaffected if the darker lens is set to 49%. Even if the darker lens is set substantially different—say 40% transmission of light—the sense of 3D it affords the viewer will be barely diminished.

Video File Compression

The disclosure had specifically referred to MPEG and QuickTime compressed video files as two video file formats that could be used by this invention. While the preferred embodiment of the invention demonstrates the principle using just the MPEG-1 format, it should be clearly understood that the principles disclosed in the invention could be used by any video compression technique that relies on temporal redundancies to calculate the 'Characteristic 3Deeps Motion Vector' or 'motion estimation values'.

Video file compression techniques are used to deliver digital motion picture files to an end-user for display in a streaming or non-streaming environment. Streaming or non-streaming refers to the delivery method of the digital video file medium rather than the medium itself. Streaming refers to media that are delivered over a telecommunications network (e.g. television, cable, DSL, WiFi, etc) and non-streaming refers to delivery by a fixed media (e.g. DVDs, file transfer, etc). In either case, video file compression techniques may be used to deliver the media and in either case the principles of this invention can be used to extract a motion estimation value associated with a frame of a compressed digital video file.

Scenes that exhibit lateral motion generally exhibit similar motion over a sequence of frames lasting many seconds, and so if motion estimation values are only estimated for a subset of frames of the motion picture it will be sufficient. While motion estimation values may be determined for every frame of the motion picture, the same principles can be used to usefully determine the motion estimation value for only some, but not all of the frames of the motion picture.

In some embodiments of the invention the digital video compression is performed in software, in other embodiments in hardware, and in still other embodiments a combination of software and hardware circuits.

Algorithm 3 was based on the difference in motion between and Upper Region (502) representing the background of the scene and the Lower Region (501) representing the foreground of the scene. If the two regions had motion in the same direction and at the same speed, then the difference would be '0' or no motion. But this case is different then the case where there really is no motion in the scene. Another version of Algorithm 3 may use different calculation depending upon whether the Upper Region and Lower Region exhibit motion in the same of different directions.

In other embodiments, the 3Deeps synchronization signals are developed from a measure of the distance between the camera and the main focus of the picture. In some embodiments this may be estimated using image processing techniques that can be used to identify and recognize objects in the filmed content of a frame. For instance, the majority of scenes in a motion picture will contain the head or eyes of an individual, and a measure of their width can then be used to estimate the distance between the camera and the main focus of the picture. The distance between the camera and the main focus is known when a picture is taken (auto range finding and auto focus are both well-known and incorporated in cameras) and may be utilized and stored. If a camera is in motion, this is also accurately and recordable when a picture is taken. Utilizing such information for 3Deeps would be useful in live broadcast of say sporting events as for Football play-cams where the distance from the field and motion of the camera is known, or with satellite imagery where the distance from the satellite to the earth, and motion of the satellite is known.

We claim:

1. A method for calculating a motion estimation value for controlling the lenses of 3Deeps Filter Spectacles comprising:

decompressing a compressed video file;

reading the decompressed video file containing pre-calculated motion vector descriptors, wherein the motion vector descriptors comprises a plurality of frame numbers and a set of motion vectors corresponding to each frame, each frame being segmented into macroblocks, and each macroblock containing a motion vector information;

accessing the set of motion vectors on a frame by frame basis, calculating a motion estimation value; and storing in a buffered area or data output file or transmitting the calculated motion estimation value in real-time for controlling the lenses of 3Deeps Filter Spectacles.

2. The method of claim 1, wherein the frame is an I-frame, P-frame or B-frame, and the motion vector information comprises a lateral or horizontal component of the motion vector of the macroblock, a vertical component of the motion vector of the macroblock, and a rotation component of the motion vector of the macroblock.

3. The method of claim 2, wherein the frame is the I-frame, and the motion estimation value is an average of all non-zero and non-null macroblock motion vectors.

4. The method of claim 2, wherein the frame is the P-frame or B-frame, and the motion estimation value is an average of all non-zero and non-null horizontal components of the macroblock motion vectors of the frame.

5. The method of claim 2, wherein the I-frame has a center of action comprising an area of a number of horizontal macro-blocks and a number of vertical macro-blocks, the motion estimation value being set to the same motion estimation value as the previous frame.

6. The method of claim 2, wherein the P-frame or B-frame has a center of action comprising an area of a number of horizontal macro-blocks and a number of vertical macro-blocks, the motion estimation value being an average of all horizontal components of macro-blocks of the frame, wherein only those horizontal components that are within the area associated with the center of action and only non-zero and non-null motion vectors are included.

7. The method of claim 2, wherein the I-frame has an upper region providing surrogate for the background of the frame and a lower region providing surrogate for the foreground of the frame, the motion estimation value being set to the same motion estimation value of the previous frame.

8. The method of claim 2, wherein the P-frame or B-frame has an upper region providing surrogate for the background of the frame and a lower region providing surrogate for the foreground of the frame, the motion estimation value being the difference between the average of all horizontal components of macro-blocks of the upper region and the average of all horizontal components of macro-blocks of the lower region, wherein only the non-zero and non-null motion vectors are included in the averaging process and all macro-blocks outside the upper region and the lower region are ignored.

9. The method of claim 1, wherein the compressed video file is in MPEG format.

10. The method of claim 1, wherein a decompressed video file for display is created containing the motion estimation value embedded into the video file.

* * * * *